United States Patent
Schiff et al.

(10) Patent No.: US 7,688,050 B2
(45) Date of Patent: Mar. 30, 2010

(54) SWITCHING POWER SUPPLY CONTROLLER WITH UNIDIRECTIONAL TRANSIENT GAIN CHANGE

(75) Inventors: Tod F. Schiff, Portland, OR (US); Jerry Zhijun Zhai, Toronto (CA); Jun Zhao, Shanghai (CN); Peng Liu, Shanghai (CN)

(73) Assignee: Semiconductor Components Industries, LLC, Phoenix, AZ (US)

( * ) Notice: Subject to any disclaimer, the term of this patent is extended or adjusted under 35 U.S.C. 154(b) by 111 days.

(21) Appl. No.: 11/555,460

(22) Filed: Nov. 1, 2006

(65) Prior Publication Data

US 2008/0197826 A1     Aug. 21, 2008

(51) Int. Cl.
*G05F 1/569* (2006.01)
*G05F 1/571* (2006.01)

(52) U.S. Cl. .................................. 323/276; 363/56.12
(58) Field of Classification Search ................. 323/274, 323/276, 282, 271, 273; 363/56.12
See application file for complete search history.

(56) References Cited

U.S. PATENT DOCUMENTS

| | | | |
|---|---|---|---|
| 4,134,079 A * | 1/1979 | Kohtani | 330/281 |
| 4,858,052 A * | 8/1989 | McDonnal | 361/18 |
| 5,744,944 A * | 4/1998 | Danstrom | 323/284 |
| 6,011,704 A * | 1/2000 | Coleman | 363/37 |
| 6,049,473 A * | 4/2000 | Jang et al. | 363/89 |
| 6,567,279 B2 * | 5/2003 | Brkovic | 363/17 |
| 6,683,441 B2 | 1/2004 | Schiff et al. | |
| 7,274,177 B2 * | 9/2007 | Huang et al. | 323/277 |
| 2002/0080631 A1 * | 6/2002 | Kanouda et al. | 363/62 |
| 2003/0098674 A1 * | 5/2003 | Ostrom | 323/276 |
| 2004/0251964 A1 * | 12/2004 | Weldon | 330/149 |
| 2005/0231279 A1 * | 10/2005 | Moffatt et al. | 330/149 |

OTHER PUBLICATIONS

Wong, Mike; Designing a High Efficiency DC-DC Converter with the EL75XX; intersil, Application Note, Mar. 24, 1998, AN1101, pp. 1-16.
PWM and Triple Linear Power Controller for Home Gateway Applications; intersil, Data Sheet, Jun. 2001, File No. 9019, pp. 1-12.
6-Bit Programmable 2-/3-/4-Phase Synchronous Buck Controller, ADP3188; Analog Devices, Inc., 2005, pp. 1-28.

* cited by examiner

*Primary Examiner*—Edward Tso
*Assistant Examiner*—Arun Williams
(74) *Attorney, Agent, or Firm*—Robert F Hightower

(57) ABSTRACT

A switching power supply controller has a nominal loop gain and transient loop gain that is only activated in response to an abrupt load change in one direction. The transient loop gain may be implemented with a series-connected diode and resistor combination arranged in a feedback configuration with an error amplifier. A large load change in one direction may swing the output of the error amplifier and forward bias the diode to create a non-linear gain change.

22 Claims, 4 Drawing Sheets

SWITCHING POWER SUPPLY CONTROLLER WITH UNIDIRECTIONAL TRANSIENT GAIN CHANGE

BACKGROUND

FIG. 1 illustrates a prior art switching power supply. The system of FIG. 1 includes a modulator 20 that generates switching control signals SC1 and SC2 to drive switch circuits 10 and 12, thereby controlling the amount of power delivered to the load 22 through inductors 14 and 16. An output filter 21 includes a series resistor/capacitor combination to filter the output from the inductors. A voltage mode error amplifier circuit 17 generates an error signal $V_{ERR}$ in response to the output voltage $V_{OUT}$ so the modulator can modulate the switch signals to maintain a constant output voltage regardless of the amount of current consumed by the load. The sensed output voltage is combined with an input signal Vref to generate the error signal that is applied to the modulator for closed-loop control of the output. The modulator 20 shown in FIG. 1 is assumed to provide pulse-width modulation (PWM), but other modulation schemes such as pulse frequency modulation (PFM), hysteretic control (ripple regulation), etc., may be used.

The system of FIG. 1 also includes a current sensing circuit 18 to generate a signal $V_{CS}$ that provides a measure of the total combined output current delivered to the load. The current sense signal may be used in numerous ways. For example, it may be used to provide over-current shutdown, it may be used to implement current-mode regulation, or it may be combined with voltage feedback to establish a droop impedance for adaptive voltage positioning (AVP) control schemes.

The system of FIG. 1 is known as a multi-phase switching power supply because the power components including the switches and inductors are repeated to produce multiple output currents that are summed together to provide the total output current. This increases the amount of current available from the power supply.

Although the circuit of FIG. 1 provides good regulation and transient response in many applications, switching power supplies for microprocessors are subject to ever more demanding performance requirements. For example, under certain operating conditions, the supply current demanded by a high performance processor may drop from full load down to 30 percent and then immediately go back up to full load at frequencies of hundreds of kilohertz (kHz). The power supply must be able to supply these rapidly changing currents while still maintaining the supply voltage within a very narrow range.

An example of a problem caused by high frequency load transients is saturation of the error amplifier. That is, when the output load current changes rapidly from a low to high or high to low level, the output signal from the error amplifier changes rapidly to force the PWM output to compensate for the given load change. Since the error amplifier is non-ideal, it has some limited minimum and maximum voltage range that can be reached if there is a large error signal generated at the output, as would be the case for very large output load changes. This may drive the error amplifier into saturation with the output at one of the voltage rail limits. Once in saturation, it takes additional time for the error amplifier to swing its output voltage back from the rail once the output voltage of the power supply has come back into regulation.

Some efforts have been made to clamp the output of the error amplifier with a diode. Although this may prevent saturation, it may also cause overshoot in response to an abrupt load change in the opposite direction, thus causing the power supply output to exceed the specified voltage range, and possibly damaging the processor which is very sensitive to supply voltage variations.

Compounding these problems is the asymmetric slew rate of the output inductors as they are typically configured in switching power supplies. PWM based DC power supplies convert an input voltage to an output voltage via a switched inductor and output filter. The input to output ratio determines the system duty cycle. However, the large signal slew rate is typically asymmetric, so large load changes may drive the PWM stage into saturation at its minimum or maximum duty cycle, and this may cause a different response and non-linear operating point depending on the direction of the load change.

DETAILED DESCRIPTION

Figure 1:
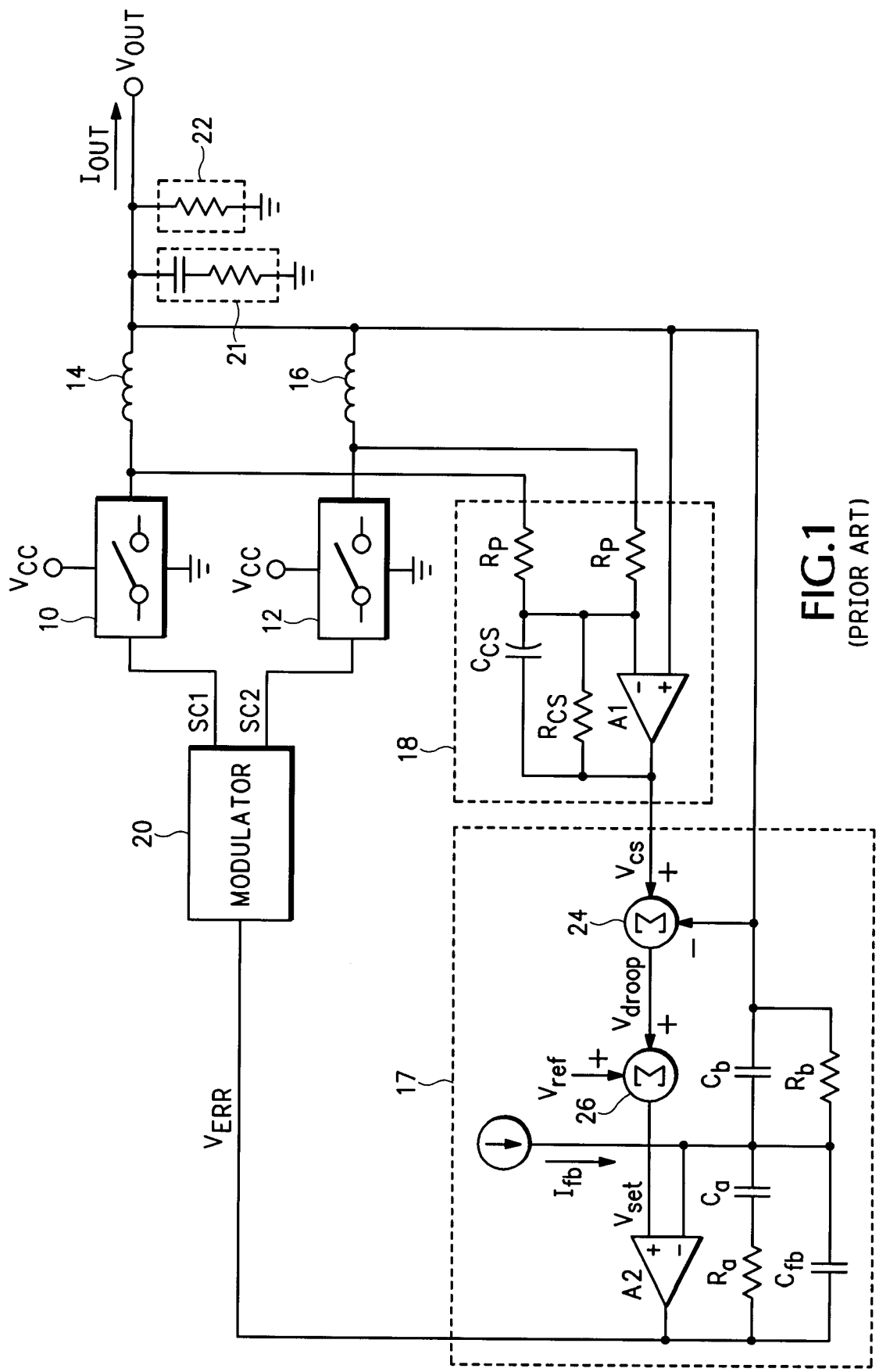
FIG. 1 illustrates a prior art switching power supply and controller.
Figure 2:
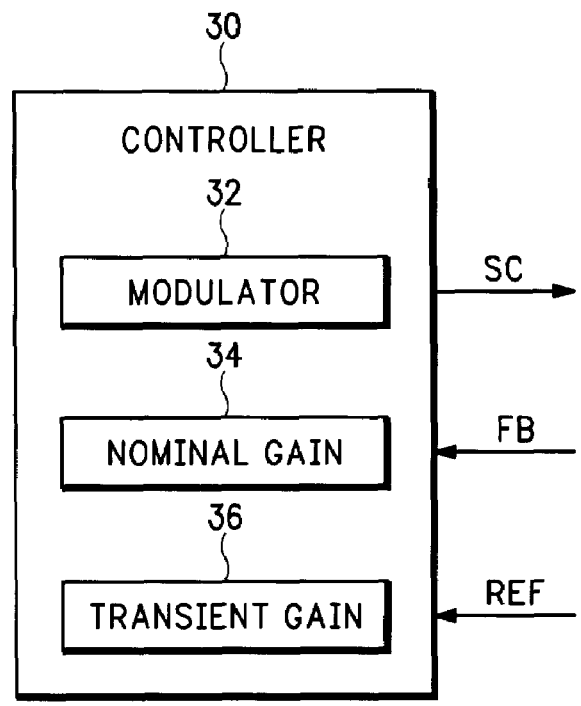
FIG. 2 illustrates an embodiment of a switching power supply controller according to some of the inventive principles of this patent disclosure.

FIG. 2 illustrates an embodiment of a switching power supply controller 30 according to some of the inventive principles of this patent disclosure. The embodiment of FIG. 2 includes a modulation circuit 32 to generate one or more switching control signals SC that may be configured to control the amount of power delivered to the load. The modulation circuit 32 may implement any suitable switching control scheme such as pulse-width modulation (PWM), pulse frequency modulation (PFM), hysteretic control (ripple regulation), etc. The controller 30 has a nominal loop gain 34 that governs the manner in which the modulation circuit normally controls the switching control signal SC in response to an output feedback signal FB and a set-point or reference signal REF. The controller also has a transient loop gain 36 that is only activated in response to an abrupt load change in one direction, for example, only in response to a sudden and steep decrease in the load (load release).

Figure 3:
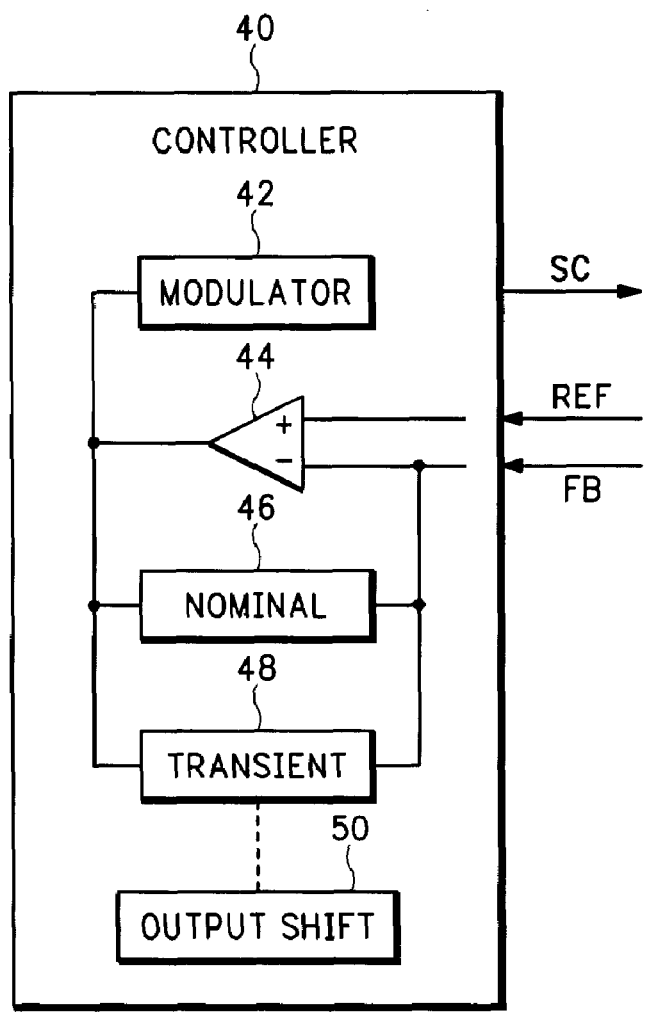
FIG. 3 illustrates another embodiment of a switching power supply controller according to some additional inventive principles of this patent disclosure.

FIG. 3 illustrates an embodiment of a switching power supply controller 40 that may be used to implement the nominal and transient loop gains of the embodiment of FIG. 2. In the embodiment of FIG. 3, an error amplifier 44 has a nominal feedback path 46 to implement the nominal loop gain, and a transient feedback path 48 to implement the transient loop gain in response to an abrupt load change in one direction. The controller may include additional functionality 50 to shift the output of the switching power supply in response to abrupt load changes in the one direction. For example, it may be arranged to shift the DC level of the output when the load changes occur at a frequency within a predetermined band.

Figure 4:
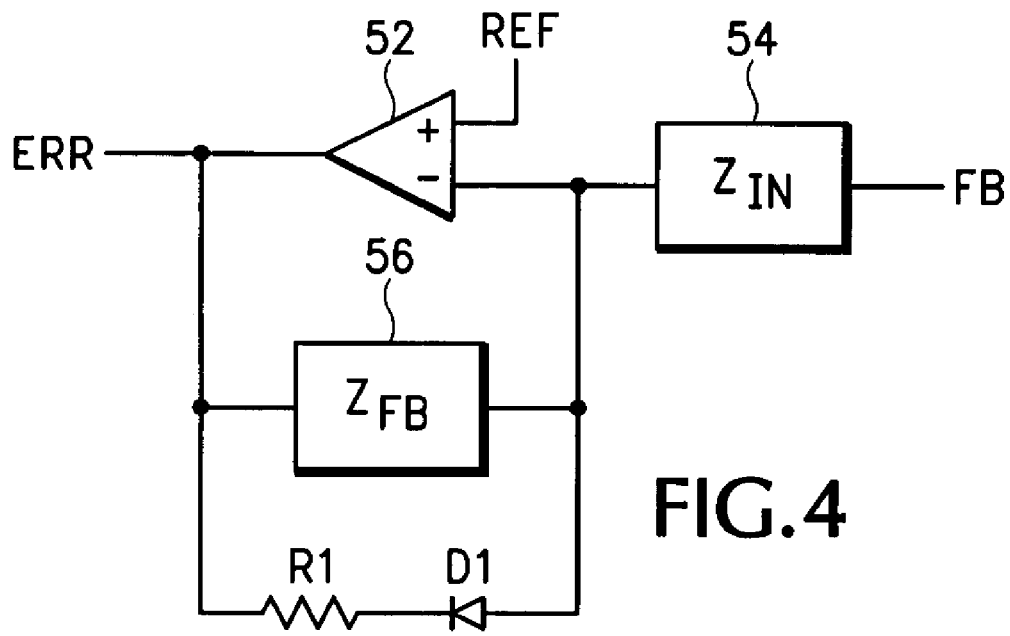
FIG. 4 illustrates an embodiment of an error amplifier for a switching power supply controller according to some additional inventive principles of this patent disclosure.

FIG. 4 illustrates an embodiment of an error amplifier for a switching power supply controller according to some additional inventive principles of this patent disclosure. The embodiment of FIG. 4 includes an amplifier 52 shown here as an operational amplifier (op amp) that generates the error signal ERR in response to the output of the switching power supply and a reference signal REF. The reference signal REF is applied to the noninverting (+) input of the op amp, and a feedback signal FB derived from the output of the switching power supply is applied to the inverting (−) input through an input network 54 having an impedance $Z_{IN}$. A feedback network 56 having an impedance $Z_{FB}$ is connected between the output and the inverting input of the op amp.

The embodiment of FIG. 4 also includes a diode D1 and a resistor R1 arranged in series in a feedback configuration with the amplifier. The loop gain and frequency compensation of the controller is nominally determined by the impedances $Z_{IN}$ and $Z_{FB}$ which form a gain control network. However, in the event of a large load change (in this example, a load release), the diode circuit provides an asymmetric gain change that may allow the controller to compensate for asymmetries in the large signal slew-rate of an output inductor. Moreover, the resistor implements a nonlinear gain change that may keep the amplifier out of deep saturation by changing the gain, rather than hard clamping the output of the error amplifier as in the prior art. This refined approach may allow the error amplifier to respond quickly to a large load change in one direction, while still preventing overshoot in the event of a subsequent large load change in the opposition direction.

Figure 5:
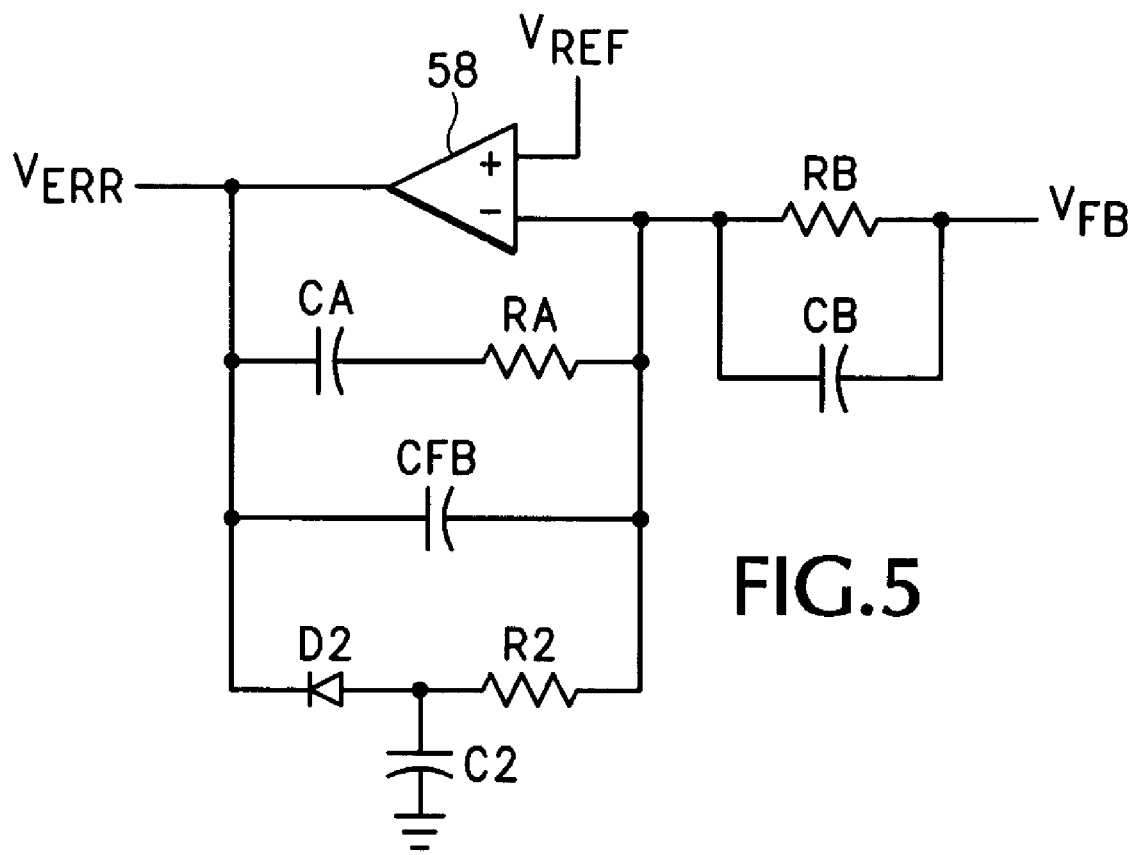
FIG. 5 illustrates another embodiment of an error amplifier for a switching power supply controller according to some additional inventive principles of this patent disclosure.

FIG. 5 illustrates another embodiment of an error amplifier for a switching power supply controller according to some of the inventive principles of this patent disclosure. This embodiment is arranged to provide voltage mode output regulation for a switching power supply, but the inventive principles are not limited to this particular implementation. Referring to FIG. 5, an op amp 58 has its (+) input coupled to receive a reference signal $V_{REF}$ which may be a simple setpoint voltage, or may include additional signal components such as a droop voltage to implement active voltage positioning (AVP). A feedback voltage $V_{FB}$ that represents the power supply output voltage is applied to the (−) input of the op amp through an input network that includes a parallel combination of resistor $R_B$ and capacitor $C_B$. A feedback network connected between the output and (−) input of the op amp includes a capacitor $C_{FB}$ in parallel with the series combination of resistor $R_A$ and capacitor $C_A$. The nominal loop gain and compensation are determined by the input and feedback networks.

The embodiment of FIG. 5 also includes a diode D2 having its cathode connected to the output of the op amp and its anode connected to a node N2. A resistor R2 is connected between N2 and the (−) input of the op amp. A capacitor C2 is connected between N2 and an AC ground which, in this example, is the control circuit ground.

The operation of the embodiment of FIG. 5 will be described in the context of a multi-phase DC-DC buck converter that utilizes a PWM control scheme for a high-performance processor, but the inventive principles are not limited to these particular details. In this example, the nominal output duty cycle is assumed to be less than 50 percent, so the ON slew rate of the output inductors is greater than the OFF slew rate. Thus, when the PWM switching signal is at minimum saturated duty cycle, it has a lower saturated slewing rate than at maximum saturated duty cycle.

Under steady load conditions, the error amp output $V_{ERR}$ is normally at a bias voltage determined by a ramp voltage in the PWM controller and the nominal output voltage, which is regulated to the voltage on the inverting (−) input of the error amp. If the load increases abruptly, the error amp output swings positive and increases the duty cycle of the PWM output. Since the ON slewing rate is relatively high, the power supply output responds rapidly and prevents the error amp from saturating at its positive rail.

If the load decreases abruptly, the PWM may go to minimum duty cycle due to the relatively low OFF slew rate. In the absence of the diode circuit, this would tend to drive the output of the error amp to its negative rail and well below the nominal error amp output voltage, thereby increasing the time required to slew back out of this state. However, the series diode D2 becomes forward biased in response to a rapid drop in the error amp output. This limits the amount of negative swing on the error amp output. Also, when the diode is forward biased, the series resistor sets the feedback gain of the error amp loop and can be sized to provide optimal closed loop gain and control of the output voltage in response to a large load decrease.

The embodiment of FIG. 5 may also provide output lift to improve the minimum output voltage during a high frequency transient event. In this example, the maximum amount of output voltage lift may be estimated by the DC current through R2:

$$V_{LIFT} = (V_{REF} - 0.3V)RB/R2 \tag{Eq. 1}$$

where D2 is implemented with a Schottky diode (hence the 0.3 volt drop).

Capacitor C2 provides an anchor for R2 and provides current to turn on D2 faster when $V_{ERR}$ drops rapidly. The charge current through R2 is mirrored to RB to lift the DC output voltage. The amount of lift may be set by tuning the value of R2, while the saturation frequency for maximum lift may be set by tuning the value of C2. Thus, the embodiment of FIG. 5 may be adjusted to provide little or no output lift at low transient frequencies, a predetermined amount of lift in a user-defined frequency band, and constant lift at transient frequencies above the band.

Figure 6:
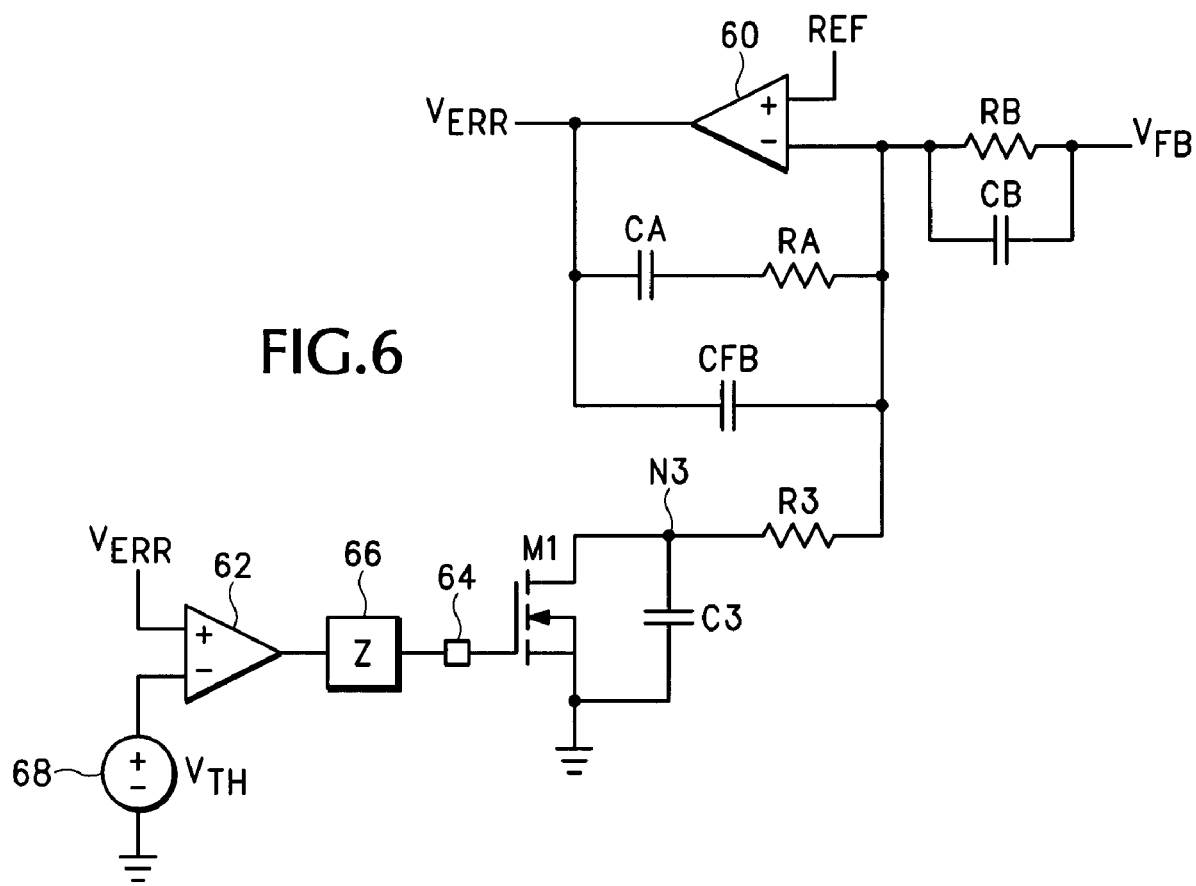
FIG. 6 illustrates another embodiment of an error amplifier for a switching power supply controller according to some additional inventive principles of this patent disclosure.

FIG. 6 illustrates another embodiment of an error amplifier for a switching power supply controller according to some additional inventive principles of this patent disclosure. This embodiment also includes a resistor R3 and capacitor C3 coupled between the inverting (−) input of error amplifier 60 and ground. The diode, however, is replaced by a transistor M1 that is arranged to pull node N3 to ground and discharge C3 when the error voltage $V_{ERR}$ exceeds a predetermined threshold $V_{TH}$ which is set by a voltage source 68. A comparator 62 drives the gate of M1 through any suitable impedance 66. In a monolithic implementation, a transient detect terminal 64 may be made available to the user. The threshold $V_{TH}$ may be programmed internally, or it may be accessible to the user.

In some embodiments, the arrangement of FIG. 6 may enable better control of the manner in which R3/C3 are switched, for example, by making the switching of R3/C3 independent of $V_{REF}$. It may also enable better control of the detection point of the $V_{ERR}$ signal.

Although the inventive principles of this patent disclosure have been described above with reference to some specific embodiments, these embodiments can be modified in arrangement and detail without departing from the inventive concepts. For example, some of the described embodiments above may provide a transient gain in response to a decreasing load, but embodiments may also be constructed to provide a transient gain in response to a increasing load. As another example, some embodiments are described as providing an asymmetric gain change, but this also applies to asymmetric compensation changes as well. Yet another example is providing lift to increase the output voltage, but the output may also be shifted in the opposite direction as well.

Some of the embodiments are described above in the context of analog circuitry where signals are realized as voltage or current mode signals, but digital implementations are also possible according to the inventive principles of this patent disclosure. In a digital implementation, a signal (e.g., an error signal) may take the form of a digital value, and the "circuitry" that manipulates this value may be logic, i.e., hardware, software, firmware, etc. or a combination thereof.

Since the embodiments described above can be modified in arrangement and detail without departing from the inventive concepts, such changes and modifications are considered to fall within the scope of the following claims.

The invention claimed is:

1. A switching power supply controller comprising:
an error amplifier having a nominal feedback path to implement a nominal loop gain and a transient feedback path to implement a transient loop gain wherein the transient loop gain is only activated in response to one of an increase or a decrease in the load but not to another of the increase or the decrease in the load and wherein the transient feedback path provides feedback between an input and an output of the error amplifier responsively to only one of the increase or the decrease in the load.

2. The controller of claim 1 where the transient feedback path includes a diode to activate the transient feedback path in response to the decrease in the load but not to the increase in the load.

3. The controller of claim 1 where the transient feedback path is arranged to shift the output of the switching power supply only in response to the decrease in load and not to the increase in the load.

4. The controller of claim 1 where the transient feedback path is arranged to shift the output when the increase or the decrease in the load occurs at a frequency within a predetermined band.

5. A switching power supply controller comprising:
a modulation circuit to generate one or more switching control signals to control the output of a switching power supply in response to an error signal;
an error amplifier to generate the error signal in response to the output of the switching power supply and a reference signal; and
circuitry coupled to an input of the error amplifier to change the gain of the error amplifier in response to only one of an increase or decrease in a load coupled to the output of the switching power supply and not to another of the increase or decrease in the load.

6. The controller of claim 5 where the circuitry changes the gain asymmetrically.

7. The controller of claim 5 where the circuitry changes the gain nonlinearly.

8. The controller of claim 5 where the circuitry provides output shift depending on the frequency of transients in the load.

9. The controller of claim 5 where the circuitry includes a diode and a resistor arranged in series in a feedback configuration with the error amplifier wherein the diode is configured to be forward biased only in response to the one of the increase or decrease in the load.

10. The controller of claim 9 where the circuitry includes a capacitor coupled to the diode and the resistor.

11. The controller of claim 10 where the capacitor is anchored to an ac ground and wherein the diode has an anode coupled to the capacitor and a cathode coupled to an output of the error amplifier.

12. The controller of claim 5 where the circuitry includes a switch arranged to change the impedance of a feedback network coupled to the error amplifier.

13. The controller of claim 12 where:
the feedback network includes a resistor coupled between the input of the error amplifier and a node, and a capacitor coupled to the node; and
the switch includes a transistor arranged to discharge the node in response to an abrupt change in the load.

14. The controller of claim 12 where the circuitry further includes a comparator arranged to drive the switch in response to an error signal and a threshold signal.

15. The controller of claim 5 where the circuitry changes the compensation of the error amplifier.

16. The controller of claim 15 where the circuitry changes the compensation asymmetrically.

17. A switching power supply controller comprising:
a modulation circuit to generate one or more switching control signals to control the output of a switching power supply in response to an error signal;
an amplifier arranged to generate the error signal in response to the output of the switching power supply and a reference signal; and
a gain control network to set the gain and compensation of the amplifier;
wherein the gain control network includes a diode and a resistor arranged in series in a feedback configuration with the amplifier wherein the diode is configured to be forward biased responsively to only one of an increase or decrease in a load coupled to the output of the switching power supply.

18. The controller of claim 17 where the gain control network includes:
an input network coupled between the output of the switching power supply and a first input of the amplifier; and
a feedback network coupled between the first input of the amplifier and an output of the amplifier.

19. The controller of claim 18 where the diode and the resistor are coupled between the first input of the amplifier and the output of the amplifier.

20. The controller of claim 19 where:
the diode is connected between the output of the amplifier and a node;
the resistor is connected between the node and the first input of the amplifier;
the input network includes a second resistor connected between the output of the switching power supply and the first input of the amplifier; and
the amplifier has a second input coupled to receive the reference signal.

21. The controller of claim 20 further including a capacitor connected between the node and an AC ground.

22. The controller of claim 17 where the gain control network further includes a capacitor coupled to the diode and the resistor.

* * * * *